United States Patent
Bensberg et al.

(10) Patent No.: US 12,210,512 B2
(45) Date of Patent: Jan. 28, 2025

(54) THROUGHPUT-OPTIMIZED SCHEMA-FLEXIBLE STORAGE WITH TRANSACTIONAL PROPERTIES

(71) Applicant: SAP SE, Walldorf (DE)

(72) Inventors: Christian Bensberg, Heidelberg (DE); Christoph Zakwieja, Eppelheim (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/752,066

(22) Filed: May 24, 2022

(65) Prior Publication Data

US 2023/0385271 A1 Nov. 30, 2023

(51) Int. Cl.
*G06F 16/23* (2019.01)
*G06F 16/21* (2019.01)
*G06F 16/27* (2019.01)

(52) U.S. Cl.
CPC ........ *G06F 16/2379* (2019.01); *G06F 16/213* (2019.01); *G06F 16/278* (2019.01)

(58) Field of Classification Search
CPC .. G06F 16/2379; G06F 16/278; G06F 16/213; G06F 16/235; G06F 16/27; G06F 16/21
See application file for complete search history.

(56) References Cited

U.S. PATENT DOCUMENTS

| | | | |
|---|---|---|---|
| 2015/0134626 A1* | 5/2015 | Theimer | G06F 11/3055 707/693 |
| 2017/0139380 A1* | 5/2017 | England | A01G 9/28 |
| 2019/0235974 A1* | 8/2019 | Pardon | G06F 11/2094 |
| 2020/0133934 A1* | 4/2020 | Eluri | G06F 16/2329 |
| 2020/0295947 A1* | 9/2020 | Young | H04L 67/06 |
| 2021/0200770 A1* | 7/2021 | Pandey | G06F 16/2477 |

* cited by examiner

*Primary Examiner* — Amy Ng
*Assistant Examiner* — Dustin D Eyers
(74) *Attorney, Agent, or Firm* — Sterne, Kessler, Goldstein & Fox P.L.L.C.

(57) ABSTRACT

Disclosed herein are system, method, and computer program product embodiments for transferring data using a failsafe storage system. In some embodiments, a database receives a request to insert records of data. The records of data are to be transmitted from the source system to the target system. The database allocates a partition in the database based on a size of the plurality of records of data. The database inserts one or more records of data in each segment. The database inserts a create timestamp in each record header of the plurality of records. The create timestamp indicates a date and time when an insert of the one or more records of data is committed in a respective segment. The database inserts a delete timestamp in each segment of records of data, as each respective record of data is transmitted to the target system.

16 Claims, 6 Drawing Sheets

THROUGHPUT-OPTIMIZED SCHEMA-FLEXIBLE STORAGE WITH TRANSACTIONAL PROPERTIES

BACKGROUND

Enterprises often transfer large amounts of data from a source system to a target system. Frequently, an application processes the data is processed before being transferred to the target system. The application may crash or encounter errors when processing the data. To address this issue, enterprises temporarily store the data in a database. This allows the application to retrieve the data from the database in case of a crash or an error.

The database stores a copy of the data to be transferred to the target system in partitions. The data is deleted from the database after being transferred to the target system. Each time the data is updated in the database, a new record is created. The new record includes the updated data and a reference to the previous version of the data. Furthermore, each time data is deleted in the database, a new record is created indicating the deleted entry. However, maintaining various versions of the data and deleted data can be costly in terms of runtime and resource consumption.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
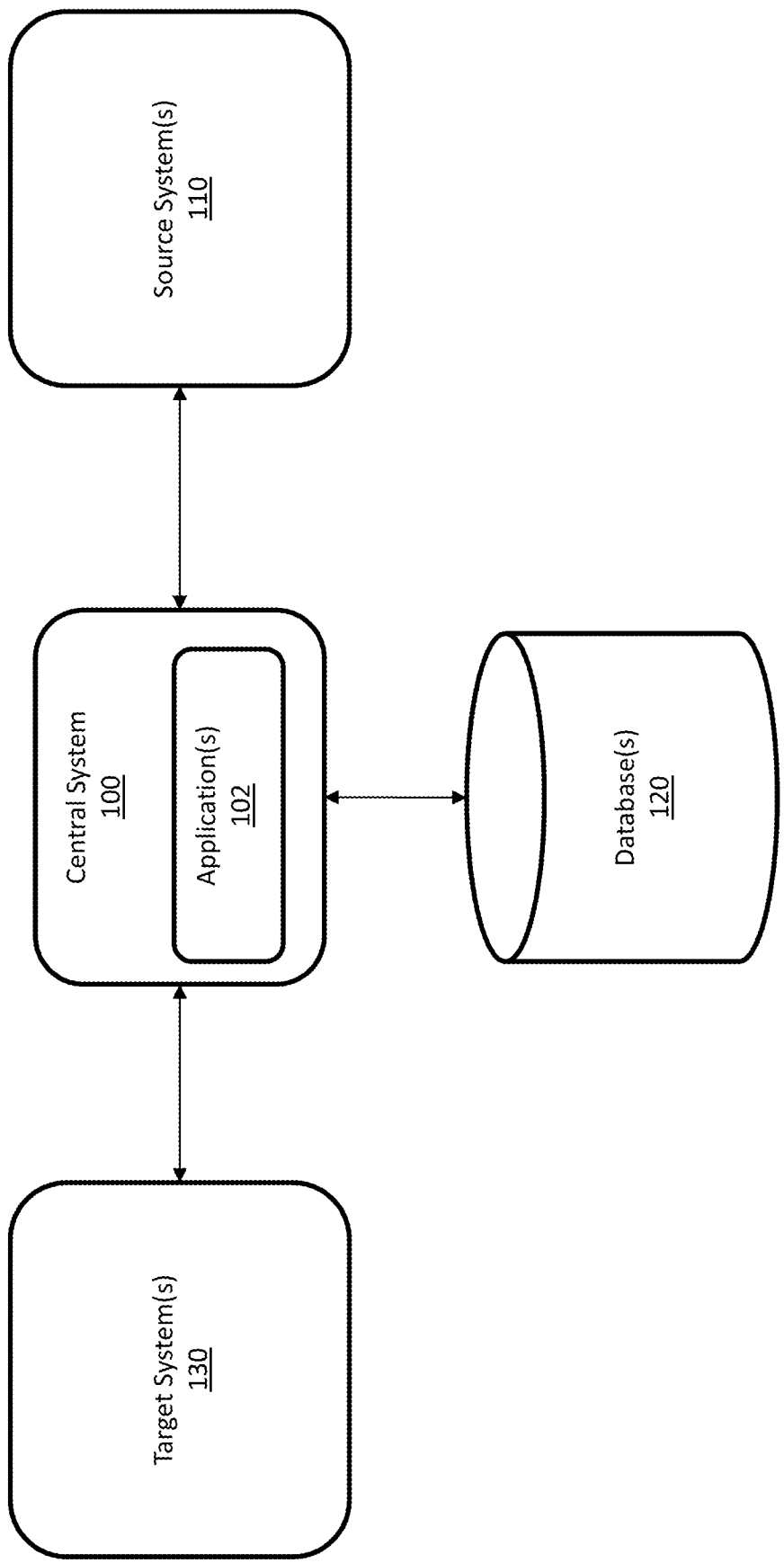
FIG. 1 is a block diagram of an architecture of a system for transferring data from a source system to a target system, according to some embodiments.

Provided herein are system, apparatus, device, method and/or computer program product embodiments, and/or combinations and sub-combinations thereof, for transferring data from a source system to a target system using throughput-optimized schema-flexible storage.

As described above, enterprises temporarily store data in a database as an intermediate step when transferring it from a source system to a target system. Along with the transfer often conversions or other forms of processing occur. In conventional systems, the database maintains the versions of the data as the data is updated and records of deleted data. However, this can be an unnecessary use of storage space in the database, as the data is meant to be stored temporarily. Furthermore, the maintenance of versions is mainly used for updates, a functionality provided by general-purpose systems or databases; but this is not always needed. As such, conventional systems are operationally expensive and relatively slow.

Furthermore, data may be stored in partitions in the database. In conventional systems, the partitions may be pre-allocated before the data is received. Conventional systems may populate the partitions based on the size of the data and the space remaining in the pre-allocated partitions. As such, the data may be dispersed across multiple partitions. This may result in inefficient use of memory space. Moreover, this may result in a difficult time locating the data for deletion. Therefore, conventional systems partitioning of the data in the database was inefficient.

Embodiments described herein resolve the above-mentioned issues by providing a throughput-optimized system for transferring data from a source system to a target system. In some embodiments, a database receives a request to insert records of data. The records of data are to be transmitted from the source system to the target system. The database allocates a partition in the database based on a size of the plurality of records of data. The partition comprises segments. The database inserts one or more records of data in each segment of the plurality of segments. The database inserts a create timestamp in each record. The create timestamp indicates a date and time when an insert of a respective record of data is committed. The database inserts a delete timestamp in each record, as each respective record is transmitted to the target system. The delete timestamp indicates a date and time a delete of the respective record is committed. In some embodiments, this timestamp is an continuously increasing unique integer number.

Embodiments described herein generate the partition in the database in response to receiving the request to transfer the records of data from the source system to the target system. This way, all of the records of data for the request are stored in a single partition. This allows for easily locating the records in the database.

Furthermore, embodiments described herein do not store versions of updated data or records of deleted data. Instead, the embodiments described herein include a create timestamp and a delete timestamp for each record of data. This allows for an application processing the data to determine whether the data may be accessed in the database. Therefore, embodiments described herein provide an optimized throughput and maintains transactional properties and visibility.

FIG. 1 is a block diagram of an architecture of a system for transferring data from a source system to a target system using throughput-optimized schema-flexible storage, according to some embodiments. In an embodiment, the architecture may include a central system 100, source system(s) 110, target system(s) 130, and database(s) 120. The devices in the architecture can be connected through wired connections, wireless connections, or a combination of wired and wireless connections.

As an example, the devices can be connected through a network. The network can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

Source system 110 may include one or more databases configured to store records of data. The data may be transferred from source system 110 to target system 130. Target system 130 may include one or more databases configured to store the records of data transferred from source system 110.

Central system 100 may include application 102. Application 102 may be configured to process data that is to be transferred from source system 110 to target system 130. For example, application 102 may execute data transformations to the data from source system 110 such that it is compatible with target system 130.

Database 120 may be configured to store data that is to be transferred from source system 110 to target system 130. Database 120 may be a throughput-optimized database. Database 120 may be configured to allocate partitions, generate partition IDs, store data in the partitions, retrieve data from the partitions, delete data, and delete partitions.

For example, the data to be transferred from source system 110 to target system 130 may be initially stored in database 120. Application 102 may retrieve the data from Database 120, process the data, and transmit the data to target system 130. Application 102 may delete the data from the database 120 once transmitted to target system 130.

Figure 2:
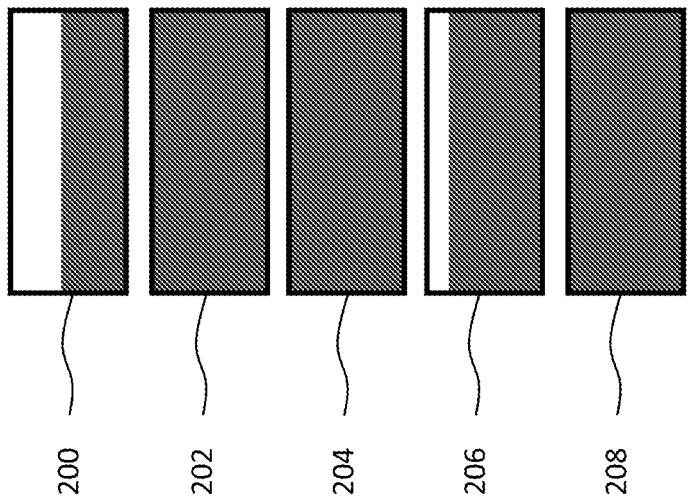
FIG. 2 is a block diagram of an example configuration of partitions in the database, according to some embodiments.
Figure 2:
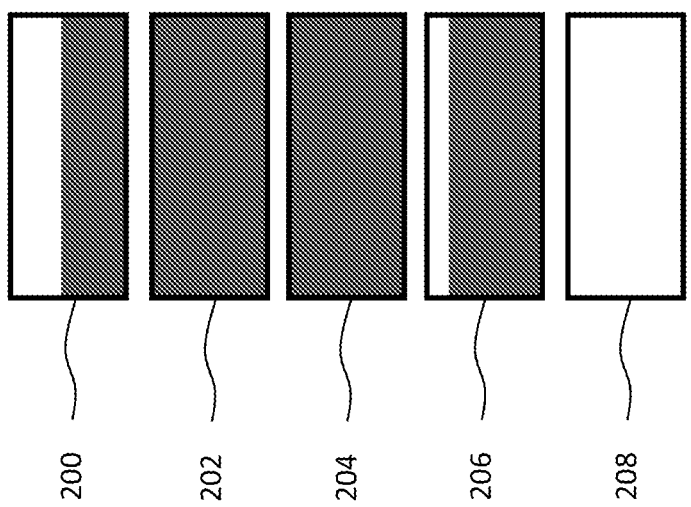

FIG. 2 is a block diagram of an example configuration of partitions in the database, according to some embodiments. FIG. 2 will be described with respect to FIG. 1.

Database 120 may store the data in partitions. For example, database 120 may include partitions 200-208. Each of partitions 200-208 may store one or more records of data. Partitions 202-204 may be full. Partitions 200 and 206 may be partially full. Partition 208-1 may be empty. Each of partitions 200-208 stores records of data associated with a specific request. In this regard, each of partitions 200-208 may be of varying sizes.

For example, source system 110 may transmit a request to central system 100 to transfer a set of records of data from source system 110 to target system 130. The request may include the set of records of data. Application 102 may execute an INSERT of the set of records of data in database 120.

Database 120 may determine a size of the set of records of data. For example, database 120 may determine that the size of the records is 10 gigabytes (GB). Database 120 may determine that partition 208 is empty and is greater than or equal to 10 GB. As such, database 120 may determine that partition 208 may store the entirety of the set of records of data received in the request. After the INSERT statements are executed, partitions 202-204 and 208 may be full. Partitions 200 and 206 may be partially full.

In some embodiments, source system 110 may transmit multiple sets of records of data associated with a single request to transfer the sets of records of data to target system 130. In this scenario, application 102 may execute multiple INSERT commands to insert the set of data records of data in database 120. Each INSERT command may correspond with a set of records of data of the multiple set of records of data. Moreover, each set of records of data may be inserted in a separate partition.

Furthermore, each set of records of data may be a different size. As such, database 120 may generate or allocate partitions that correspond to the size of each set of records of data before executing the INSERT command for the respective set of records.

Figure 3:
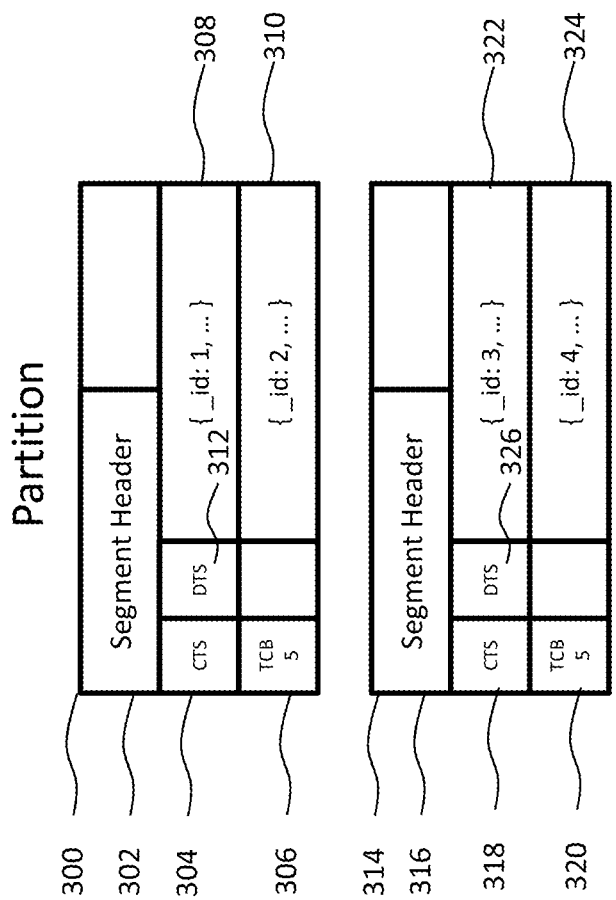
FIG. 3 illustrates the segments in the partitions of a database, according to some embodiments.

FIG. 3 illustrates the segments in the partitions of a database, according to some embodiments. FIG. 3 will be described with reference to FIGS. 1-2

Each partition (e.g., partitions 200-208) may store one or more segments. Each segment may store one or more records of data. For example, central system 100 may receive a request to transfer a set of records of data from source system 110 to target system 130. The set of records of data may comprise four records: 1, 2, 3, and 4.

Application 102 may insert the set of records of data into the database 120. Database 120 in turn will create a partition (e.g., partition 208). To this end, application 102 may execute an INSERT statement to insert the set of records of data in database 120. In response to application 102 executing the INSERT statement, database 120 may insert the set of records of data in partition 208. Subsequently, application 102 may request a COMMIT command to commit the set of records of data in partition 208. The COMMIT command allows the set of records of data to be accessed from partition 208 by other transactions.

Segment 300 may store records 1 and 2 and segment 314 may store records 3 and 4. Segment 300 may include blocks 308 and 310. Block 308 may store record 1's identifier (e.g., 1) and the data associated with record 1. Block 310 may store record 2. Block 310 may store the record 2's identifier (e.g., 2) and the data associated with record 2. Segment 314 may also include blocks 322 and 324. Block 322 may store the record 3's identifier (e.g., 3) and the data associated with record 3. Block 324 may store the record 4's identifier (e.g., 4) and the data associated with record 4.

For record 2, database 120 may include a reference to a Transaction Control Block (TCB) in field 306. A TCB exists for all currently ongoing transactions (e.g., inserts or deletes). In this regard, one or more transactions may be ongoing for record 2. The ongoing transactions are transactions that have not yet been committed or rolled back. Record 2 refers to the respective TCB using the reference in field 306.

In some embodiments, a commit is an atomic operation. Once it occurs, the effect may be reflected asynchronously in data structures, like the TCB reference in field 306. Another asynchronous operation may then replace the TCB reference in field 306 with the commit timestamp that was determined during the atomic commit. Once this has taken place, the TCB reference in field 306 may be freed so that it may be used for future transactions.

For example, once an INSERT is committed, database 120 may generate a commit timestamp. The commit timestamp may be the create timestamp (CTS) for the respective record. Similarly, once a DELETE operation is committed, database 120 may generate a commit timestamp. The commit time stamp may be the delete timestamp (DTS) for the respective record.

As such, in response to committing the INSERT of record 1, database 120 may generate a commit timestamp. The commit timestamp for the insert of record 1 may be the CTS for record 1. The CTS may be included in field 304. The CTS may be a date and time of when record 1 was committed in segment 300. As a non-limiting example, the CTS may be in the following format YYYY-MM-DD HH24:MI:S. In some embodiments, an incrementing number is used that serves as a unique identifier for the commit.

Once application 102 transmits record 1 to target system 130, application 102 may issue a DELETE request to delete record 1. Database 120 will mark record 1 for deletion by writing a new TCB reference into the field 312. Field 312 may be a pre-determined TCB field to store a TCB reference for delete transactions. The DELETE request may be an ongoing transaction. Once database 120 commits the DELETE of record 1, database 120 generate a commit timestamp. The commit timestamp is used as the DTS for record 1. The DTS is included in field 312.

Application 102 may transmit an INSERT request for records 3 and 4. Database 120 may insert records 3 and 4 in segment 314. Once database 120 commits the INSERT of record 3, database 120 may generate a commit timestamp. The commit timestamp for the insert of record 1 may be the CTS for record 3. The CTS may be inserted in field 318.

Once application 102 transmits record 3 to target system 130, application 102 may issue a DELETE request to delete record 3. Database 120 will mark record 3 for deletion by writing a new TCB reference into the field 312. Field 326 may be a pre-determined TCB field to store a TCB reference for delete transactions. The DELETE request may be an ongoing transaction. Once database 120 commits the DELETE of record 3, database 120 generate a commit timestamp. The commit timestamp is used as the DTS for record 3. The DTS is included in field 326.

For record 4, database 120 may include a reference to a TCB in field 320. A TCB exists for all currently ongoing transactions (e.g., inserts or deletes). In this regard, one or more transactions may be ongoing for record 4. Record 4 refers to the respective TCB using the reference in field 320.

A transaction may only consider records that have been committed or that were written by the transaction itself. In an example, two processes may create a new transaction and SELECT data from the database. Depending on the read timestamp of the newly opened transaction they may or may not consider certain records. The CTS and DTS may be sufficient to determine whether a record must be considered or not. But in case a transaction writes data, it must be able to read it again—therefore a TCB reference must be used to determine whether the record was written before in the same transaction.

Each time the application 102 opens a connection to database 120, a new transaction is started. With each transaction, a "transactional view" is determined. Typically, the transactional view is the highest commit timestamp in the system. That is, the transactional view may include all of the records in database 120 that have not been marked for deletion. In some embodiments, a commit timestamp is a number that is continuously incremented with each commit executed. Using this transactional view, the application 102 may read all data that has been previously committed in database 120. As indicated above, once records 1-4 are committed in segments 300 and 314, records 1-4 will be considered by other transactions (as their transactional view is then sufficiently high). Application 102 may transmit a request to retrieve one or more of the set of records of data from segment 300 or 314 to process the one or more records of data.

Fields 304 and 312 may be visibility fields for record 1. That is, fields 304 or 312 may be used to determine whether record 1 may be viewed in a transactional view. Record 1 may be accessed by application 102 if the insert of record 1 has been committed, as indicated in field 304. Furthermore, record 1 may not be accessible to application 102 if the delete of record 1 has been committed, as indicated in field 312.

Similarly, fields 318 and 326 may be visibility fields for record 3. That is, fields 318 and 326 may be used to determine whether record 3 may be viewed in a transactional view. Record 1 may be accessed by application 102 if the insert of record 3 has been committed, as indicated in field 318. Furthermore, record 3 may not be accessible to application 102 if the delete of record 1 has been committed, as indicated in field 326.

For example, a transaction to retrieve or view data in database 120, may generate a Read Timestamp. The existence of the CTS makes the records of data accessible for other transactions in database 120 that have a higher Read Timestamp than the CTS. Transactions that have a Read Timestamp greater than the DTS of the respective record cannot access the respective record.

Database 120 does not allow for updates of the set of records of data. This is because database 120 is configured to temporarily store the set of records of data while the set of records of data is processed and transmitted to target system 130. As such, database 120 does not maintain various versions of data as it is updated.

Furthermore, by maintaining a CTS and DTS, database 120 does not maintain newer versions of the record that indicate that it has been deleted with a certain commit. In some embodiments, systems with multiple versions keep the previous versions accessible as long as there may be transactions that may consider them due to their transactional view. Rather, CTS and DTS are used to determine whether a record must be considered for a transaction based on its transactional view. Once there is no running transaction with a transactional view lower than the DTS, asynchronous garbage collection may restructure the records and hence evict the data that cannot be accessed anymore by any transaction from memory. This allows for maintaining full transactional capabilities while providing an efficient usage of the database 120. Transactional capabilities may include inserting data in database 120, retrieving data from database 120, and deleting data from database 120.

In some embodiments, when application 102 inserts data into the database 120, database 120 will create a new partition for the incoming data. Database 120 will then report the ID of the newly created partition to application 102. When the transaction commits, database 120 may generate a CTS for a partition (e.g., partition 208) and set the CTS for the entire partition rather than on record level. Nevertheless, the CTS of the partition is used to determine whether the records of data (e.g., records 1-4) are to be considered by other transactions. Furthermore, once application 102 processes the set of records of data and transmits the set of records of data to target system 130, application 102 may issue a DELETE statement for the partition using the partition ID from database 120. The DELETE of the partition is committed similarly to committing the DELETE of individual records, as described above. Once the DELETE is committed, transactions may not consider the partition anymore based on its DTS. Database 120 may drop partition 208 entirely at once. This requires less overhead as CTS and DTS are maintained on partition level. Also for deletions it is not necessary to find the individual records that shall be deleted, instead entire partitions may be dropped at once. The partition ID is transient data. That is, if application 102 crashes or fails it loses the partition ID. In case the application 102 is restarted due to a fail or crash, application 102 identifies the records that are remaining to be transmitted to target system 130. This provides a fail-safe by preventing loss of data and ensuring that application 102 processes and transmits all of the necessary records to target system 130.

Figure 4:
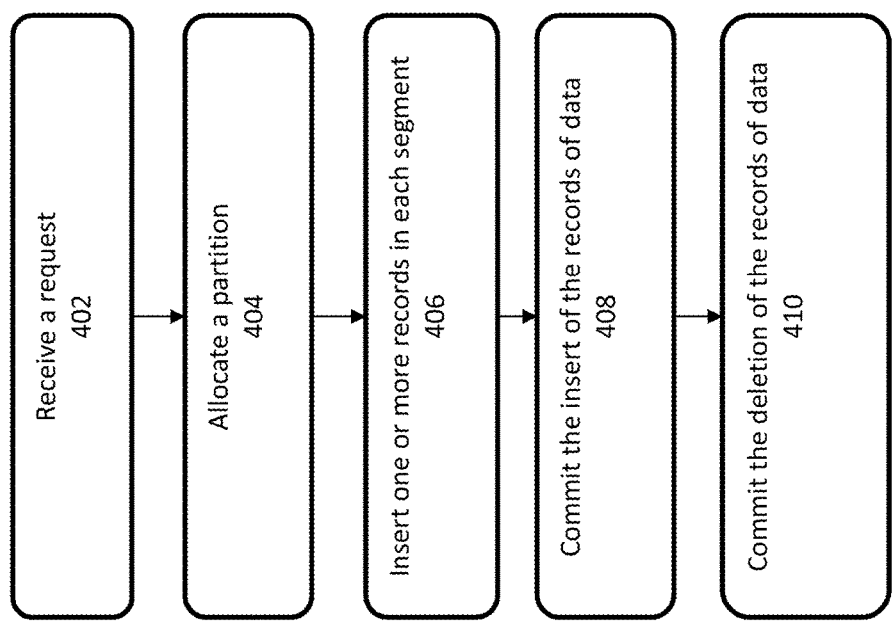
FIG. 4 is a flowchart illustrating a process for transferring data from a source system to a target system, according to some embodiments.

FIG. 4 is a flowchart illustrating a process for transferring data from a source system to a target system using throughput-optimized schema-flexible storage, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 4, as will be understood by a person of ordinary skill in the art.

Method 400 shall be described with reference to FIG. 1. However, method 400 is not limited to that example embodiment.

In 402, database 120 receives a request to insert records of data. The records of data are to be transmitted from source system 110 to target system 130. The request may be received from application 102 of central system 100. Specifically, application 102 may transmit an INSERT command to database 120 to insert the records of data.

In 404, database 120 allocates a partition in database 120 based on a size of the records of data. The partition comprises segments. For example, if the size of the records of data is 10 GB, database 120 may allocate a partition of 10 GB in database 120. The partitions in database 120 may be of varying sizes.

In 406, database 120 inserts one or more records of data in each segment in the partition. Each record has two fields that contain transaction visibility information: A timestamp when the record was created and deleted. For the newly inserted data, a TCB reference is stored. It facilitates that the record may be read by the transaction that inserts the data.

In 408, database 120 commits the insert of the records of data. Application 102 may request the commit of the insert of the records of data in the partition. During the COMMIT processing, database 120 replaces the TCB reference with a CTS. The existence of the CTS makes the records of data accessible for other transactions in database 120 that have a higher Read Timestamp than the CTS.

In 410, database 120 commits the delete of the records of data. Application 102 may request the deletion of the records of data from the database 120 and request a COMMIT of the deletion, once the records have been processed and transmitted to target system 130. During the COMMIT processing, database 120 inserts a DTS per record that got deleted. Transactions that have a Read Timestamp greater than the Delete Timestamp, or DTS, cannot retrieve the data anymore.

Figure 5:
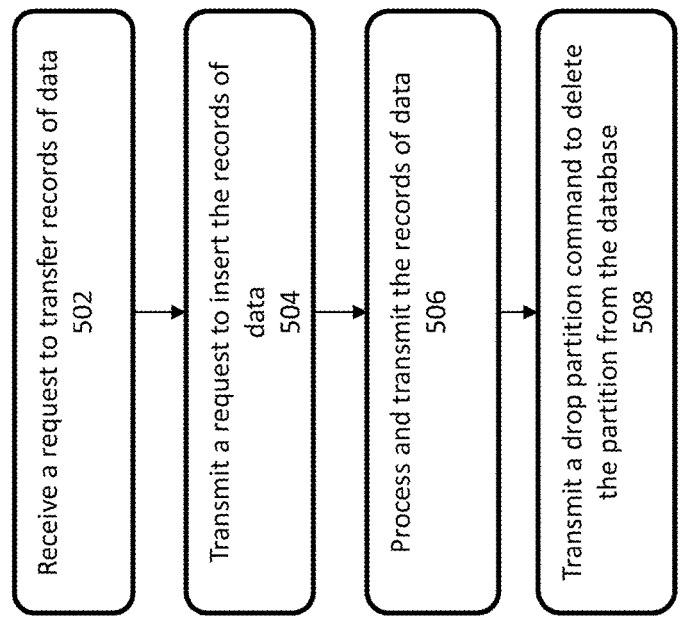
FIG. 5 is a flowchart illustrating a process for scheduling a deletion of a partition, according to some embodiments.

FIG. 5 is a flowchart illustrating a process for scheduling a deletion of a partition, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 5, as will be understood by a person of ordinary skill in the art.

Method 500 shall be described with reference to FIG. 1. However, method 500 is not limited to that example embodiment.

In 502, application 102 receives records of data from source system 110 that is to be processed and sent to target system 130.

In 504, application 102 transmits a request to database 120 to insert the records of data. Database 120 allocates a partition in database 120 based on a size of the records of data. The partition comprises segments. Database 120 inserts one or more records of data in each segment in the partition. Database 120 notifies the partition ID of the newly created partition to application 102.

In 506, application 102 processes and transmits the records of data to target system 130. Application 102 identifies a partition to be deleted based on the partition ID. For example, application 102 may track whether the records of data stored in a given partition of the one or more partitions have been processed and transmitted to target system 130 using the partition IDs. If so, application 102 may determine that the partition is to be deleted.

In 508, application 102 transmits an DROP PARTITION command to database 120 specifying the partition ID. Database 120 marks the partition for deletion. During commit processing, database 120 generates a DTS for the partition and stores it on partition level. Transactions that have a Read Timestamp greater than the Delete Timestamp, or DTS, cannot retrieve the data in the partition (e.g., the records) anymore.

Figure 6:
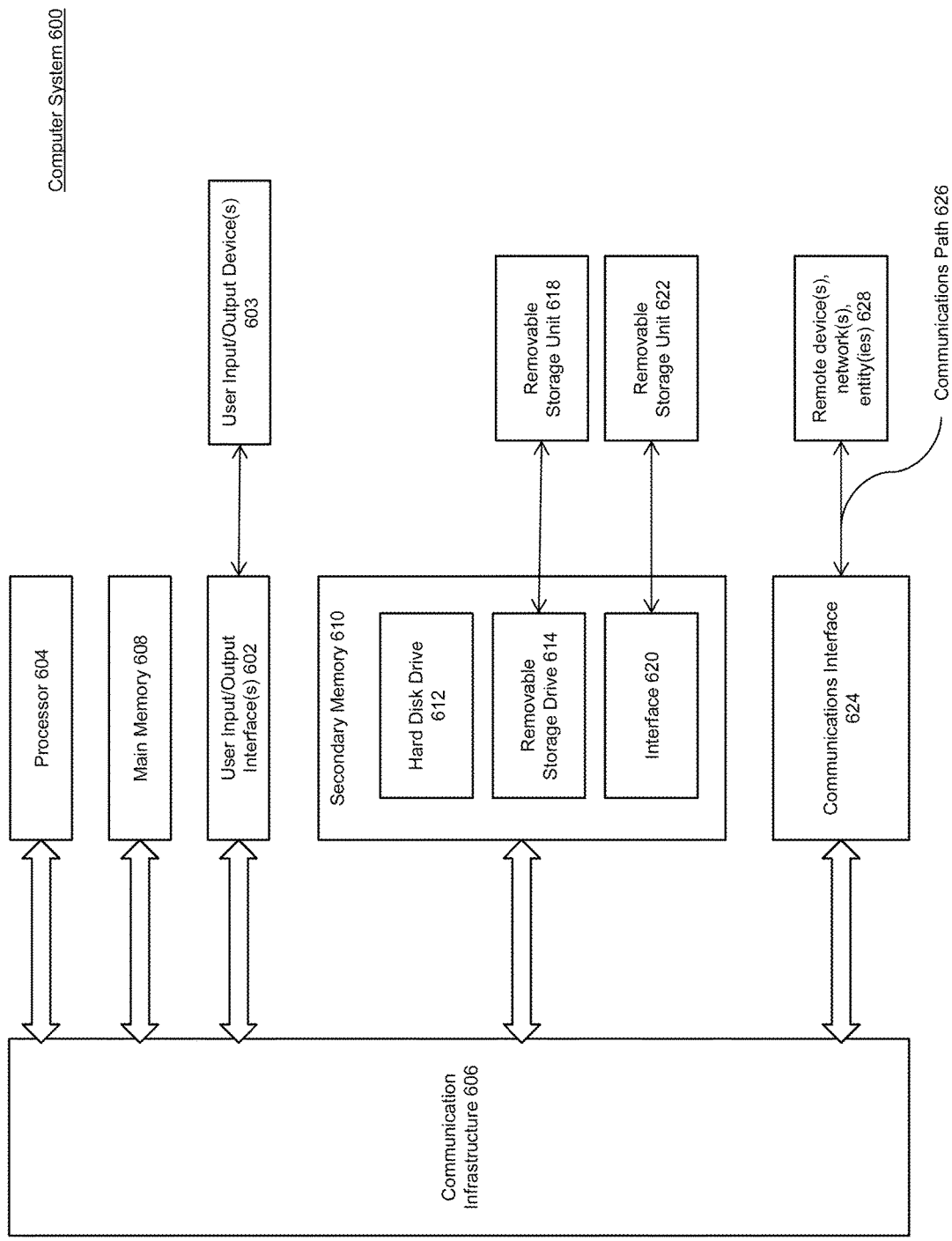
FIG. 6 is an example computer system useful for implementing various embodiments.

Various embodiments can be implemented, for example, using one or more computer systems, such as computer system 600 shown in FIG. 6. Computer system 600 can be used, for example, to implement methods 400 of FIG. 4 and 500 of FIG. 5. Furthermore, computer system 600 can be at least part of central system 100, source system 110, target system 130, and Database 120, as shown in FIG. 1. For example, computer system 600 route communication to various applications. Computer system 600 can be any computer capable of performing the functions described herein.

Computer system 600 can be any well-known computer capable of performing the functions described herein.

Computer system 600 includes one or more processors (also called central processing units, or CPUs), such as a processor 604. Processor 604 is connected to a communication infrastructure or bus 606.

One or more processors 604 can each be a graphics processing unit (GPU). In an embodiment, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., that communicate with communication infrastructure 606 through user input/output interface(s) 602.

Computer system 600 also includes a main or primary memory 608, such as random access memory (RAM). Main memory 608 can include one or more levels of cache. Main memory 608 has stored therein control logic (i.e., computer software) and/or data.

Computer system 600 can also include one or more secondary storage devices or memory 610. Secondary memory 610 can include, for example, a hard disk drive 612 and/or a removable storage device or drive 614. Removable storage drive 614 can be a floppy disk drive, a magnetic tape drive, a compact disk drive, an optical storage device, tape backup device, and/or any other storage device/drive.

Removable storage drive 614 can interact with a removable storage unit 618. Removable storage unit 618 includes a computer usable or readable storage device having stored thereon computer software (control logic) and/or data. Removable storage unit 618 can be a floppy disk, magnetic tape, compact disk. DVD, optical storage disk, and/any other computer Database. Removable storage drive 614 reads from and/or writes to removable storage unit 618 in a well-known manner.

According to an exemplary embodiment, secondary memory 610 can include other means, instrumentalities, or other approaches for allowing computer programs and/or other instructions and/or data to be accessed by computer system 600. Such means, instrumentalities, or other approaches can include, for example, a removable storage unit 622 and an interface 620. Examples of the removable storage unit 622 and the interface 620 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 can further include a communication or network interface 624. Communication interface 624 enables computer system 600 to communicate and interact with any combination of remote devices, remote networks, remote entities, etc. (individually and collectively referenced by reference number 628). For example, communication interface 624 can allow computer system 600 to communicate with remote devices 628 over communications path 626, which can be wired and/or wireless, and which can include any combination of LANs, WANs, the Internet, etc. Control logic and/or data can be transmitted to and from computer system 600 via communication path 626.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment." "an example embodiment," or similar phrases indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for transferring data from a source system to a target system, the computer-implemented method comprising:

receiving a request to insert a plurality of records of data, wherein the plurality of records of data are to be transmitted from the source system to the target system:

allocating a partition in a database based on a size of the plurality of records of data, wherein the partition comprises a plurality of segments, wherein the database comprises an intermediary computing system where data is transferred from the source system prior to transfer to the target system, and wherein the partition is identified by a partition identifier;

inserting one or more records of data of the plurality of records of data in each segment of the plurality of segments in the partition;

generating a create timestamp for the partition identifier in lieu of assigning a create timestamp to each record of data of the plurality of records of data, wherein the create timestamp indicates a date and time when the one or more records of data inserting in the partition are committed to the partition;

providing each record from the partition to the target system; and generating a delete timestamp for the partition identifier in lieu of generating a unique delete timestamp for each record of data of the plurality of records of data, wherein the generating the delete timestamp for the partition identifier generates less overhead than generating the unique delete timestamp for each record, and wherein the delete timestamp indicates a date and time when the plurality of records of data of the partition corresponding to the partition ID are transferred to the target system.

2. The computer-implemented method of claim 1, wherein the plurality of records of data are processed before the providing to the target system.

3. The computer-implemented method of claim 1, further comprising:
   marking the partition for deletion using the partition identifier in response to the plurality of records of data being transmitted to the target system.

4. The computer-implemented method of claim 1, further comprising:
   receiving a second request to retrieve a record of data of the plurality of records of data, wherein the second request includes a timestamp of the second request; and
   retrieving the record of data from a segment of the plurality of records of data based on determining the timestamp of the second request is after the create timestamp of the partition.

5. The computer-implemented method of claim 1, further comprising:
   marking a respective record of data for deletion by including a transaction reference in a field of the respective record; and
   replacing the transaction reference with the delete timestamp in response to the commit of the deletion of the respective record of data.

6. The computer-implemented method of claim 5, wherein the transaction reference in a field of the respective record indicates whether a respective transaction is ongoing such that it has neither been committed nor rolled back.

7. The computer-implemented method of claim 1, wherein the database does not maintain multiple versions of data when the data is updated.

8. The computer-implemented method of claim 1, wherein the delete timestamp replaces a transaction control block indicating that one or more transactions associated with the partition were ongoing.

9. A system for transferring data from a source system to a target system, the system comprising:
   a memory; and
   a processor coupled to the memory, wherein the processor is configured to:
   receive a request to insert a plurality of records of data, wherein the plurality of records of data are to be transmitted from the source system to the target system;
   allocate a partition in a database based on a size of the plurality of records of data, wherein the partition comprises a plurality of segments, wherein the database comprises an intermediary computing system where data is transferred from the source system prior to transfer to the target system, and wherein the partition is identified by a partition identifier;
   insert one or more records of data of the plurality of records of data in each segment of the plurality of segments in the partition;
   generate a create timestamp for the partition identifier in lieu of assigning a create timestamp to each record of data of the plurality of records of data, wherein the create timestamp indicates a date and time when the one or more records of data inserting in the partition are committed to the partition;
   provide each record from the partition to the target system; and
   generate a delete timestamp for the partition identifier in lieu of generating a unique delete timestamp for each record of data of the plurality of records of data, wherein the generating the delete timestamp for the partition identifier generates less overhead than generating the unique delete timestamp for each record, and wherein the delete timestamp indicates a date and time when the plurality of records of data of the partition corresponding to the partition ID are transferred to the target system.

10. The system of claim 9, wherein the plurality of records of data are processed before the providing to the target system.

11. The system of claim 9, wherein the processor is further configured to:
    mark the partition for deletion using the partition identifier in response to the plurality of records of data being transmitted to the target system.

12. The system of claim 9, wherein the processor is further configured to:
    receive a second request to retrieve a record of data of the plurality of records of data, wherein the second request includes a timestamp of the second request; and
    retrieve the record of data from a segment of the plurality of records of data based on determining the timestamp of the second request is after the create timestamp of the partition.

13. The system of claim 9, wherein the processor is further configured to:
    mark a respective record of data for deletion by including a transaction reference in a field of the respective record; and
    replace the transaction reference with the delete timestamp in response to the commit of the deletion of the respective record of data.

14. A non-transitory computer-readable medium having instructions stored thereon that, when executed by at least one computing device, cause the at least one computing device to perform operations comprising:
    receiving a request to insert a plurality of records of data, wherein the plurality of records of data are to be transmitted from a source system to a target system;
    allocating a partition in a database based on a size of the plurality of records of data, wherein the partition comprises a plurality of segments, wherein the database comprises an intermediary computing system where data is transferred from the source system prior to transfer to the target system, and wherein the partition is identified by a partition identifier;
    inserting one or more records of data of the plurality of records of data in each segment of the plurality of segments in the partition;
    generating a create timestamp for the partition identifier in lieu of generating a unique create timestamp for each record of the plurality of records of data, wherein the create timestamp for the partition identifier indicates a date and time when the one or more records of data inserting in the partition are committed to the partition, and wherein the generating the create timestamp for the partition identifier generates less overhead than generating the unique create timestamp for each record;
    providing each record from the partition to the target system;
    detecting that the plurality of records of data of the partition corresponding to the partition ID were transferred to the target system; and
    issuing a delete partition command for the partition ID after the detecting.

15. The non-transitory computer-readable medium of claim 14, wherein the operations further comprise:
    marking the partition for deletion using the partition identifier in response to the plurality of records of data being transmitted to the target system.

16. The non-transitory computer-readable medium of claim 14, wherein the operations further comprise:
- receiving a second request to retrieve a record of data of the plurality of records of data, wherein the second request includes a timestamp of the second request; and
- retrieving the record of data from a segment of the plurality of records of data based on determining the timestamp of the second request is after the create timestamp of the partition.

* * * * *